United States Patent
White

[11] Patent Number: 5,445,570
[45] Date of Patent: Aug. 29, 1995

[54] CHAIN GUIDE LINK

[75] Inventor: David C. White, Dryden, N.Y.

[73] Assignee: Borg-Warner Automotive, Inc., Sterling Heights, Mich.

[21] Appl. No.: 196,310

[22] Filed: Feb. 15, 1994

[51] Int. Cl.⁶ .............................................. F16G 13/00
[52] U.S. Cl. ..................................................... 474/213
[58] Field of Search .......................... 474/206, 212–217

[56] References Cited

U.S. PATENT DOCUMENTS

| | | |
|---|---|---|
| 2,525,561 | 10/1950 | Pierce . |
| 3,377,875 | 4/1968 | Sand . |
| 3,495,468 | 2/1970 | Griffel . |
| 3,540,302 | 11/1970 | Bendall . |
| 3,742,776 | 7/1973 | Avramidis . |
| 4,010,656 | 3/1977 | Jeffrey . |
| 4,342,560 | 8/1982 | Ledvina et al. . |
| 4,509,937 | 4/1985 | Ledvina et al. ...................... 474/213 |
| 4,547,182 | 10/1985 | Rattunde . |
| 4,758,210 | 7/1988 | Ledvina . |
| 4,759,740 | 7/1988 | Cradduck . |
| 4,911,682 | 3/1990 | Ivey et al. . |
| 4,915,675 | 4/1990 | Avramidis . |
| 5,176,586 | 1/1993 | Sugimoto . |

FOREIGN PATENT DOCUMENTS 4-210144  7/1992  Japan .

*Primary Examiner*—Michael Powell Buiz
*Attorney, Agent, or Firm*—Willian Brinks Hofer et al.; Greg Dziegielewski

[57] ABSTRACT

A guide link for use in a power transmission chain having a plurality of other links. The other links have a pair of spaced apertures and have a thickness and a hardness. The guide link has a pair of spaced apertures surrounded by a pair of upward extending toes. The toes have an outside flank and an inside flank with the inside flanks joined by a rounded crotch. The root of the crotch depends below the uppermost portion of the apertures. The thickness and hardness of the guide link is different from the other links so that the guide link has a yield load that is less than the yield load of the other links.

29 Claims, 6 Drawing Sheets

CHAIN PITCH DISTRIBUTION
GUIDE HARDNESS APPROXIMATELY 5 UNITS LESS THAN INNER LINKS

CHAIN PITCH DISTRIBUTION  Fig. 18
GUIDE HARDNESS APPROXIMATELY 8 UNITS LESS THAN INNER LINKS
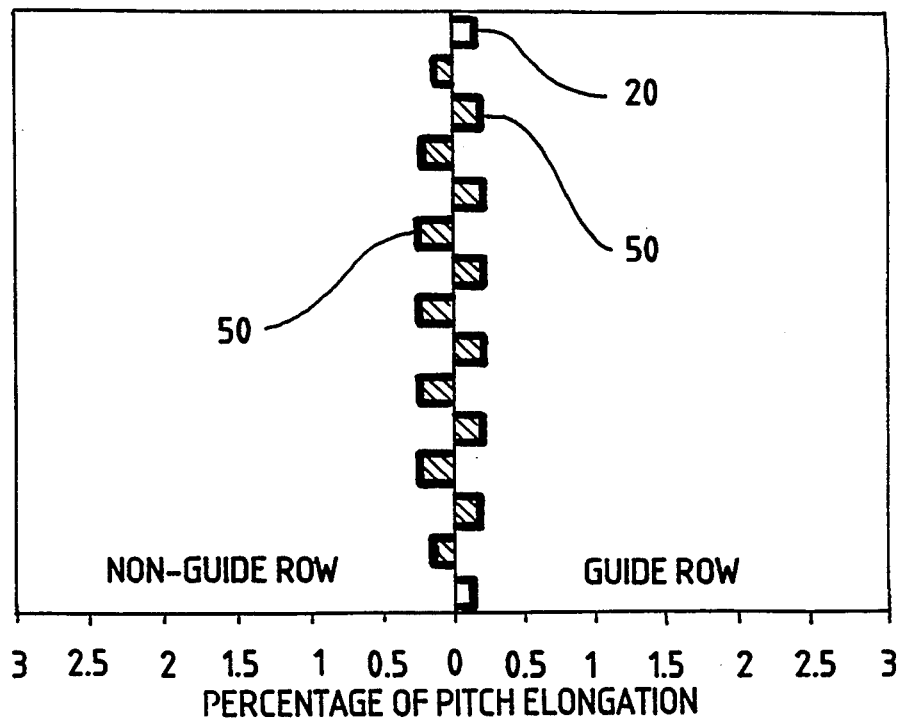
PERCENTAGE OF PITCH ELONGATION
Fig. 19
CHAIN PITCH DISTRIBUTION
GUIDE HARDNESS APPROXIMATELY 11 UNITS LESS THAN INNER LINKS
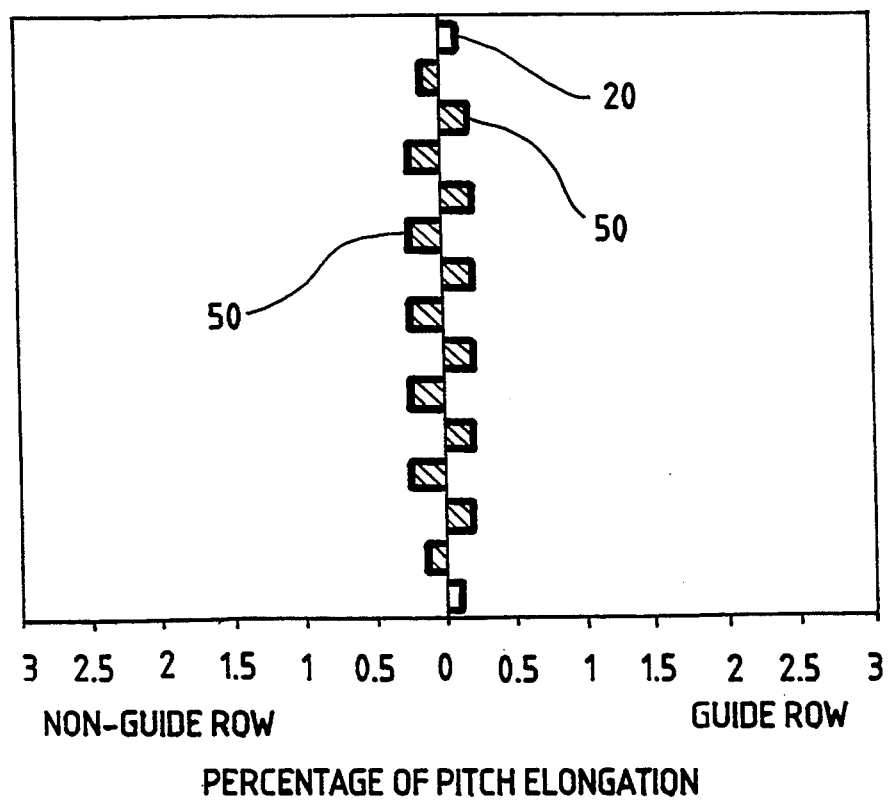
PERCENTAGE OF PITCH ELONGATION

CHAIN GUIDE LINK

BACKGROUND OF THE INVENTION

The present invention generally relates to power transmission chains and particularly to an improved guide link for power transmission chains.

Power transmission chains are widely used in the automotive industry. Such chains are used for engine timing devices as well as for the transfer of power from the engine to the transmission or the transfer of power in a transfer case. Power transmission chains are also widely used in industrial applications.

Generally, the chain is made from a plurality of individual links positioned side by side to form a row or rank and any number of these rows or ranks are joined together by pivot members to form an endless chain. There may be as few as 60–100 rows of links in a typical chain or as many as 120 rows of links. The number of links in a given row or rank may as few as two or in some cases there may be upwards of 40 positioned adjacent to each other.

Power transmission chains may include those chains especially adapted to connect the pulleys of a variable pulley transmission. The chain generally comprises a plurality of interleaved or laced sets of links with each link having a pair of spaced apertures. The apertures are arranged so that a pivot member joins adjacent sets of links to permit the chain to articulate. Such a chain is generally characterized by the presence of a load block member associated with each sets of links and oriented generally transversely to the links. An example of this type of chain is found in U.S. Pat. No. 5,007,883, which is incorporated herein by reference.

Another type of power transmission chain is referred to as a "silent chain." Conventional silent chains typically include both guide links and inverted tooth links. The guide links hold the chain in alignment on the sprocket and are generally positioned either in the center to fit into a center guide groove in the sprocket or are positioned on the outside edges of alternate sets of links. Guide links typically do not mesh with the sprocket. The inverted tooth links, or sprocket engaging links, provide the transfer of power between the chain and the sprocket. Each inverted tooth link typically includes a pair of apertures and a pair of depending toes or teeth. Each me is defined by an inside flank and an outside flank. The inside flanks are joined at a crotch. The inverted tooth links are typically designed so that the links contact the sprocket teeth to transfer power between the chain assembly and the sprocket. The inverted tooth links or driving links contact the sprocket teeth along their inside link flanks or their outside link flanks or combinations of both flanks.

A set or rank of links is assembled from several links positioned alongside of or laterally adjacent to each other. The links are connected by a pivot member, that can be a pin received in the apertures. The pivot member can also comprise a rocker joint, that may include a pair of pins or alternatively, a single pin. Where the rocker joint includes a pair of pins, one of the pins is secured in openings in one of the groups of links and the other pin is secured in openings in the other group of links. Both pins pass through openings in both sets of links, and both pins have arcuate faces for rocking engagement to render the chain flexible. Typically, only one of the pins is secured in the aperture of the guide link while the other pin extends to but not within the aperture of the guide link.

An example of a silent chain is found in U.S. Pat. No. 4,342,560, which is incorporated herein by reference. An example of a silent chain that can be used in engine timing applications is found in U.S. Pat. No. 4,759,740, which is also incorporated herein by reference.

The silent chain may include a plurality of sets of guide links that flank sets of inside links. To assemble the chain, the apertures of one link set are transversely aligned with one set of apertures of the next adjacent link set. Such an arrangement is commonly known as block lacing. More particularly, the inside links are substantially identical and are placed side-by-side in a row to form a block. Rows or sets of such block laced inside links are preferably alternated with guide link rows. The sets with guide links do not contain any inside links. An example of a block laced chain can be found in U.S. Pat. No. 5,192,253 which is incorporated herein by reference.

Alternatively, the silent chain may include a plurality of guide links that flank interleaved sets of inside links. An example of a silent chain having interleaved sets of inside links can be found in U.S. Pat. No. 4,342,560 referred to above. The inside links are alternately positioned and interconnected by a pivot member that is received by the guide links. Accordingly, one set will be in the so-called guide link row and the other set will be in the so-called non-guide link row.

A conventional silent chain drive is comprised of an endless silent chain wrapped about at least two sprockets supported by shafts. Rotation of a driving sprocket causes power transmission through the chain and a consequent movement of a driven sprocket. A conventional chain drive may include a chain assembly of extended width in order to provide a chain of greater strength. Alternatively, two narrower chain assemblies may be placed side-by-side between pairs of sprockets in order to achieve the equivalent power transmission results as a single extended width chain.

The silent chain drive may also include those chain drives whose driving or inner links are modified as well as the chain sprockets. For example, U.S. patent application Ser. No. 07/885,194 owned by the present assignee and incorporated herein by reference discloses providing a phased relationship between a pair of random or hybrid chain assemblies and a pair of sprockets. The phasing involves modifications to the chain construction, the sprocket construction, and the relationship between the positioning of the chain assemblies and sprockets. The modifications to the sprockets include the use of split sprockets that are phased by one-half tooth, or one-half pitch as well as various other amounts of pitch. The randomization of the sprocket teeth may be in any manner, such as variable spacing, relieved teeth, or tooth elimination.

The modifications to the chain assemblies include randomization by the use of single toe and two toed links in the same or dual chain assemblies as well as the use of link sets of two different configurations, or links of a first set being different from links of a second set. The links of the two link sets may differ in contour, flank configuration, leading inside flank configuration, outside flank configuration, pitch, orientation (as with asymmetrical links, types of driving contact with the sprocket teeth or other types of randomization.

During the operation of power transmission chains in being continuously propelled between a driving sprocket and a driven sprocket, a chain is subjected to many different types of forces, stresses, strains, torque and the like. As the chain moves between the driving sprocket and the driven sprocket, it will be readily understood that when each row of links contacts a sprocket tooth the links in a row will be subjected to forces.

Generally, the pivot members are press fit in the apertures of the guide links and the guide links are fashioned as a solid link without toes and are therefore stiffer than the inner links. Consequently, for a predetermined load such as in a pre-stress operation, the inner links may be deformed a greater amount than the guide links. This difference in deformation may produce an elongation in the pitch of an inner link that is greater than the outer or guide links causing the pin to bend since the pin is connected to the guide links. As a result, the pivot member may experience greater stress near the guide links causing the pivot member to fracture.

One solution to these problems is identified in U.S. Pat. No. 4,915,675 where the guide links are modified to achieve equal deformation with other inner links within each rank so as to improve the load distribution across each rank. The guide links have less stiffness so that they elongate substantially similarly to the inner links in each of the guide link rows. As a result, elastic deformation of the guide links and the inner links is substantially equal and the pivot members are maintained substantially parallel to each other. U.S. Pat. No. 4,915,675 teaches that this elastic deformation of the guide links and inner links can be made to be substantially the same by configuring the guide link in a kidney-shape and changing its thickness. Depending on the particular lacing pattern chosen for the links, the guide links will have a stiffness of a determined amount less than the inner link stiffness in order to achieve substantially the same elastic deformation as the inner links.

In a like manner, U.S. Pat. No. 2,525,561 shows guide links being shaped in side elevation and dimensioned in cross section so that it has the same elastic properties and the same pitchwise elongation as inner driving links.

Another solution is identified in U.S. Pat. No. 5,176,586 where the rigidity guide links is made to be one-half the rigidity of the other links so that all the links have an equal rate of elongation with respect to the tensile load of the chain. The rigidity is made to be one-half by configuring the guide link with a centrally located window and by modifying its thickness so that it is one-half the thickness of the inner links or by modifying the guide link material so that its Young's modulus of elasticity is one-half that of the inner links or by modifying both the thickness and the material of the guide link.

Similarly, U.S. Pat. No. 4,547,182 shows a chain belt for use in a variable-ratio transmission. The chain belt is constructed in a three-link arrangement where similarly located end portions of a link are offset by two pivot members so that a transverse staggering pattern of the links will repeat for each three links. In order to obtain the same cross-sectional area of the links at any one transverse position, the outer links have one-half the thickness of the inner links. As a result, the sum of the loads placed on the respective links, with respect to the width of the chain and the pivot members, may be balanced depending on the elongation of the respective link elements, when loaded.

Yet another solution is identified in U.S. Ser. No. 08/098,433, filed Jul. 28, 1993 now U.S. Pat. No. 5,345,753 issued Sep. 13, 1994, corresponding to Japanese patent application 4-210144 filed Dec. 7, 1990 and laid open in Japan on Jul. 31, 1992, incorporated herein by reference. In that application, the deformation of the guide links is made equal to the deformation of the inner links. In other words, when a load is applied to the chain, the elongation of the guide link is almost the same as that of the inner links. To achieve equal deformation, the guide link is provided with a center opening, a slit with a curved surface, or two inclined slits.

These solutions may be satisfactory so long as the load on the inner links is less than the yield load of the inner links. If, however, the load on the inner links is greater than the yield load for the inner links, such as during a pre-stress operation, the inner links may be plastically deformed while the guide links are only elastically deformed. In this case, the inner links will attain a "new" pitch, while the guide links, because they were only elastically deformed will resume their original pitch. This difference in pitch may result in residual bending of the pivot member and a decrease in the fatigue strength of the chain strand.

One solution to these problems is to form the guide links so that its pitch is longer than the original pitch of the inner links. Consequently, when the inner links are plastically deformed, their "new" pitch will be substantially the same as the original pitch of the guide links which are only elastically deformed.

The present invention solves these problems by providing an improved guide link for use in a power transmission chain having a yield load that is less than the yield load of the inner links, preferably about one-half less. In this way, the guide links will plastically deform at the same time as the inner links so that the "new" pitch of the inner links and the guide links can be made to be substantially the same. To provide a guide link with a yield load less than the yield load of the inner links, one or more or all of the characteristics of configuration, thickness, or hardness is modified.

SUMMARY OF THE INVENTION

The present invention is directed to a guide link for use in an endless power transmission chain having a plurality of chain links. In one embodiment, each chain link comprises two guide links interleaved with a plurality of inner links, and two pivot members connecting the guide links with each guide link having a yield load that is less than the yield load of the inner links. Each guide link and inner link have a pair of spaced apertures. A portion of each of the plurality of inner links are disposed between the guide links. Each of the pivot members are received in opposing apertures of each of the guide links and pass through at least one aperture of each of the inner links.

The power transmission chain may be of the "silent chain" type or of the type used in variable pulley transmissions where the chain includes load block members. Where the chain is a silent chain, it may be block laced or may be interlaced. Each of the inner links may be identical or may differ in one or more aspects of their shape or construction. For example, the links may differ in contour, flank configuration, pitch, orientation (as with asymmetrical links), type of driving contact with the sprocket teeth, and number of toes (i.e., one toe on one set and two toes and the second set).

The pivot member may be a single pin, it may also be a single pin rocker joint construction or a typical rocker joint construction where a pin and a rocker are provided with the pin extending into the aperture of the guide link and both the pin and the rocker extending through the aperture of the inner link.

The guide link may be an inner guide link wherein each chain link comprises a single guide link having spaced apertures flanked by a plurality of driving links having spaced apertures and two pivot members passing through the spaced apertures provided in the guide link and at least one of the apertures in the driving links. The guide link has a yield load less than the yield load of the driving links. It will be understood that the driving links may have the same configuration as the inner links used in a chain strand where the guide links flank the inner links. Accordingly, the driving links in an inner guide link chain, may also be referred to as inner links.

In a preferred embodiment, the guide link has a configuration with a bottom, a pair of spaced apertures surrounded by a pair of upward extending toes. The toes are defined by an inside flank and an outside flank with the inside flanks joined by a rounded crotch. The root of the crotch extends at least below the top of the apertures. In addition, the guide link also has a thickness and hardness less than the thickness and hardness of the inner links so that the guide link has a yield load less than the yield load of the inner links.

In a particular embodiment of the present invention, a guide link for use in a power transmission chain has a concave bottom, a pair of spaced apertures, and a pair of toes that surround the apertures and have an outside flank and an inside flank, and are joined by a rounded crotch with the root of the crotch depending below the horizontal centerline of the apertures so that the guide link has a yield load that is less than the yield load of the other links. In another embodiment, the guide links also have a thickness less than the thickness of the inner links. In yet another embodiment, the guide links also have a hardness less than the hardness of the other links. In this embodiment, the hardness of the guide links is preferably at least eight units less than the hardness of the inner links. Most preferably, the guide links have a hardness and a thickness less than the hardness and thickness of the other links.

In another embodiment, a power transmission chain is provided having a plurality of chain links, with each chain link comprising a plurality of guide links, a plurality of inner links, and pivot members. The guide links have a yield load less than the yield load of the inner links. The guide links also have a pair of spaced apertures to define a guide link pitch that is substantially the same as the inner link pitch after a pre-stressing operation. Each of the inner links have a pair of spaced apertures to define an inner link pitch with at least a portion of the inner links disposed between the guide links. The pivot members connect the guide links, with a pivot member received in opposing apertures of each of the guide links and passing through at least one aperture of each of the inner links.

The present invention also includes a method of producing a power transmission chain wherein substantially all of its links have substantially the same pitch after a pre-stress operation. The method includes providing a plurality of inner links and guide links with the guide links having a yield load less than the yield strength of the inner links; connecting the inner links and the guide links to form an endless chain strand such that a chain link includes at least a portion of the inner links disposed between the guide links; and pre-stressing the chain strand. Each of the guide links have a pair of spaced apertures to define a first guide link pitch and each of the inner links have a pair of spaced apertures to define a first inner link pitch. Two pivot members connect the flanking guide links with each pivot member received in opposing apertures of each of the guide links and passing through at least one aperture of each of the inner links. The chain strand is pre-stressed at a load greater than the yield load of the inner link to provide a second guide link pitch different from the first guide link pitch and a second inner link pitch different from the first inner link pitch, with the second guide link pitch being substantially the same as the pitch of substantially all of the inner links.

The term "hardness" as used in the preceding and following description as well as in the claims refers to the Rockwell hardness on the C scale. The term "yield load" as used in the preceding and following description as well as in the claims refers to the tensile load at which plastic deformation begins to occur.

BRIEF DESCRIPTION OF THE DRAWINGS

FIG. 18 is a graph depicting the percentage of the pitch elongation of each of the links of a chain link in a chain according to FIG. 11 when pre-stressed to 65 percent of the tensile strength and using the guide link of the present invention that has a hardness about eight units less than the hardness of the inner links.

FIG. 19 is a graph depicting the percentage of the pitch elongation of each of the links of a chain link in a chain according to FIG. 11 when pre-stressed to 65 percent of the tensile strength and using the guide link of the present invention that has a hardness about eleven units less than the hardness of the inner links.

DETAILED DESCRIPTION OF THE INVENTION AND PREFERRED EMBODIMENTS

Figure 1:
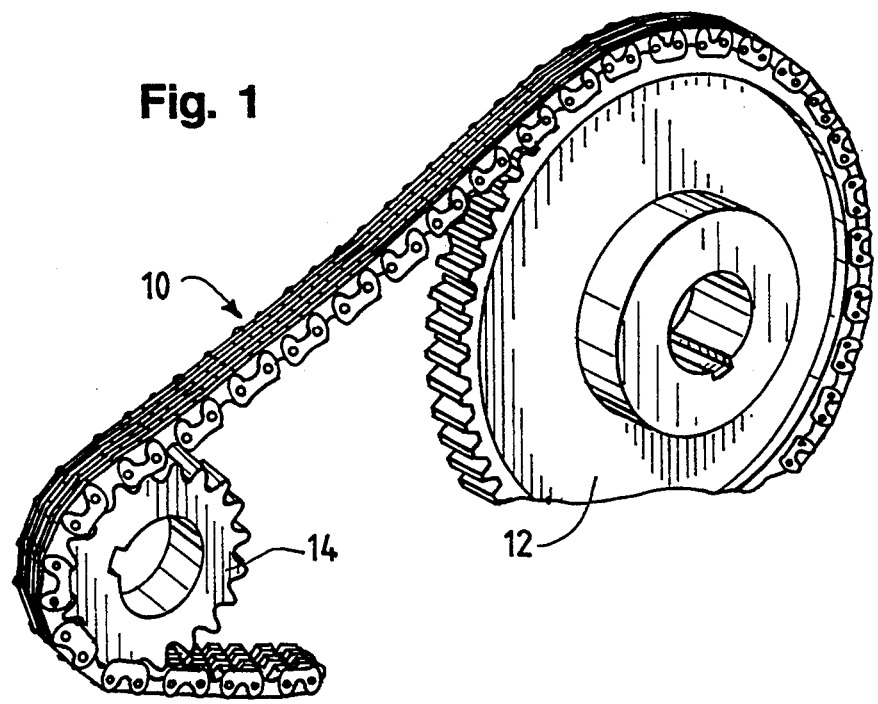
FIG. 1 is a perspective view of a drive chain showing a chain, a driving sprocket, and a driven sprocket in an assembled relationship with the chain comprising a plurality of sets or ranks of interleaved inner links connected together by pivot members and including guide links of the present invention positioned at the outer ends of alternate inner links throughout the length of the chain.

Turning now to the drawings, FIG. 1 generally illustrates a portion of a power transmission chain and a sprocket assembly comprising a silent chain 10 utilizing the guide link 20 of the present invention, a driving sprocket 12, and a driven sprocket 14. The sprockets are mounted on shafts, such as an engine crankshaft or engine camshaft. The sprockets may be of different diameters and may have a different number of differently shaped teeth.

The chain 10 is constructed from a plurality of chain links positioned side-by-side to form sets or rows. In the embodiment of FIG. 1, the chain includes guide link rows 16 interleaved with non-guide link rows 18 best seen in FIGS. 2 and 3. The guide link rows are comprised of guide links 20 and, in the embodiment of FIG. 1, inner links 50 while the non-guide link rows are comprised of inner links 50. Each of the inner links may be identical for example, all of the links may have the configuration illustrated in FIG. 7 or in FIG. 8. Alternatively, the inner links may have a different configuration so that, for example, some of the inner links have the configuration illustrated in FIG. 7 while other inner links have the configuration illustrated in FIG. 8. Of course, the inner links may have more than two different configurations. The guide link 20 of the present invention is shown more clearly in FIGS. 4 and 6.

Figure 13:
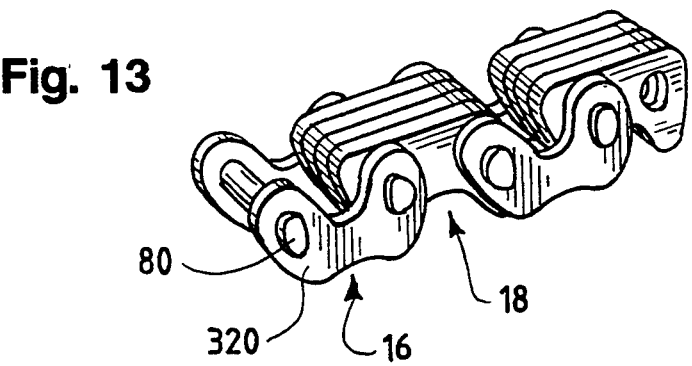
FIG. 13 is a perspective view of a segment of a chain in a block lacing construction and including the guide link of the present invention.
Figure 14:
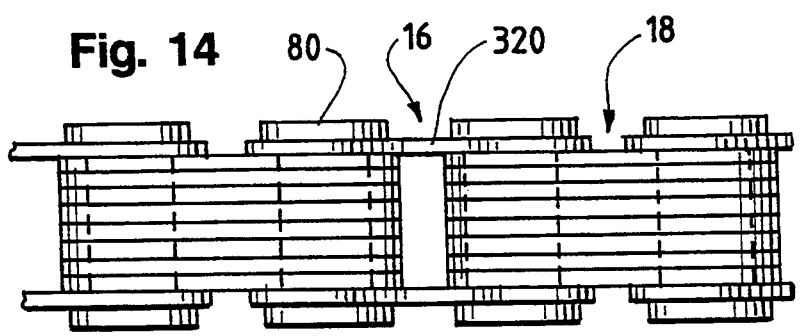
FIG. 14 is a plan view of a segment of the chain of FIG. 13.

In another embodiment, best seen in FIGS. 13 and 14, the sets of inner links are laced in blocks so that the guide link rows 16 do not include inner links. In yet another embodiment, best seen in FIG. 15, the inner links are preferably interlaced to provide support for a load block 90, useful for variable pulley transmissions. The inner links, however, may also be block laced.

Adjacent sets of links are joined by pivot members 80 received in apertures provided in the inner and guide links. Where the guide links flank the inner links, the guide links may be welded or press-fitted to the pivot members. The pivot members may be pins that are round or any suitable shape to extend through the apertures provided in the inner links and the guide links. The pivot members may also comprise a rocker joint, which may include a pin and a rocker. Examples of a rocker joint including a pin and rocker are shown in U.S. Pat. Nos. 4,010,656 and 4,507,106, which are incorporated herein by reference. The rocker joint may also be formed from a single pin and an associated link aperture. Examples of such a rocker joint are shown in U.S. Pat. No. 5,192,253, U.S. Ser. No. 07/961,077, now U.S. Pat. No. 5,334,111 issued Aug. 2, 1994, and U.S. Ser. No. 196,598 (Attorney Docket No. 92051 titled Interlaced Single Pin Rocker Joint Chain, assigned to the same assignee as the present invention and filed together with the present application), all of which are incorporated herein by reference.

In the silent chain embodiments, the guide links maintain the lateral alignment of the chain on the sprockets. The guide links may be along the outside of the chain, i.e., flanking the inner links, and have no driving engagement with the sprocket teeth. The guide links are therefore distinguished from the inner links by their lack of sprocket tooth contacting members. An example of a silent chain is found in U.S. Pat. No. 4,342,560, which is incorporated herein by reference. An example of a silent chain that can be used in engine timing applications is found in U.S. Pat. No. 4,759,740, which is also incorporated herein by reference. The guide link of the present invention may also be used as an inside guide link in which case the sprocket is grooved to receive the inside link. As with the flanking guide links, the inside guide link does not have sprocket tooth contacting members. An example of a chain link construction in which the guide link of the present invention may be used is found in U.S. Pat. No. 2,602,344, which is incorporated herein by reference.

In the variable pulley transmission embodiments, the chain is used to transfer power between a pair of variable pulleys. The guide links are generally provided on the outside of the chain link to flank the inner links. The inner links are provided in sets that are generally interleaved together. The links have aligned apertures for receiving the pivot members. The pivot members can provide the method for the transfer of power between the chain and sheaves of the pulley by allowing the sheaves to directly contact the ends of the pivot members in a driving engagement.

Load blocks 90 or load carrying members that are positioned on the chain between the spaced pivot members can also provide the method for transfer of power between the pulleys. The load blocks can be in the form of struts that are carried in a passageway below the links. Alternatively, the load blocks can extend around the links of the chain and have one or more windows for receiving the chain links. The load blocks have generally tapered outer or end surfaces that engage the sheave faces of the pulleys to provide the driving engagement between the pulleys and the chain. Examples of power transmission chains suitable for use in a variable pulley transmission are shown in U.S. Pat. Nos. 4,507,106, 4,911,682 and 5,007,883, all of which are incorporated herein by reference.

Figure 2:
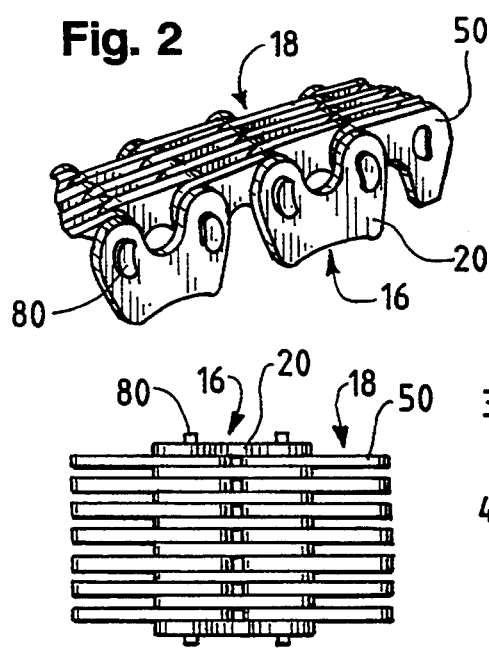
FIG. 2 is a perspective view of a segment of the chain of FIG. 1 and including the guide links of the present invention.
Figures 3, 4, 5:
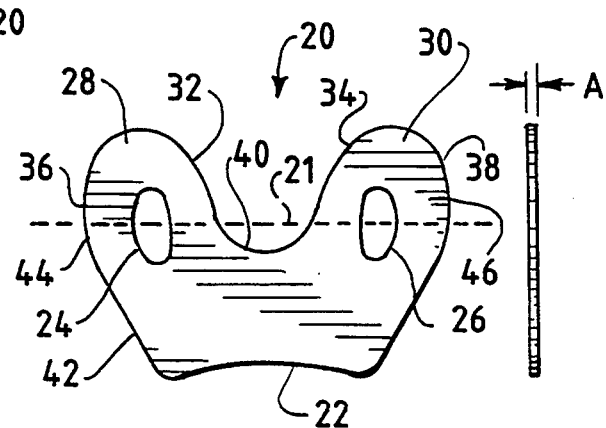
FIG. 3 is a top plan view of a segment of the chain of FIG. 2.
FIG. 4 is a side view of a link form for a guide link of the present invention.
FIG. 5 is an end view of the link of FIG. 4.

Referring more particularly to FIGS. 2-8, there is shown a silent chain incorporating the guide link of the present embodiment. FIGS. 2 and 3 illustrate a chain having an interlaced construction wherein the guide link row 16 includes flanking guide links 20 and interleaved inner guide row links 50 and wherein the non-guide link row 18 includes inner non-guide row links 50. A chain link can be considered to be the set or row disposed between two opposing guide links. Accordingly, the chain link includes a pair of opposed guide links 20, a plurality of inner links 50 with at least a portion of the inner links disposed between the guide links, and pivot members 80 connecting the guide links and passing through at least one aperture of the inner links.

Figure 7A:
FIG. 7A is an end view of the link of FIG. 7.
Figure 7:
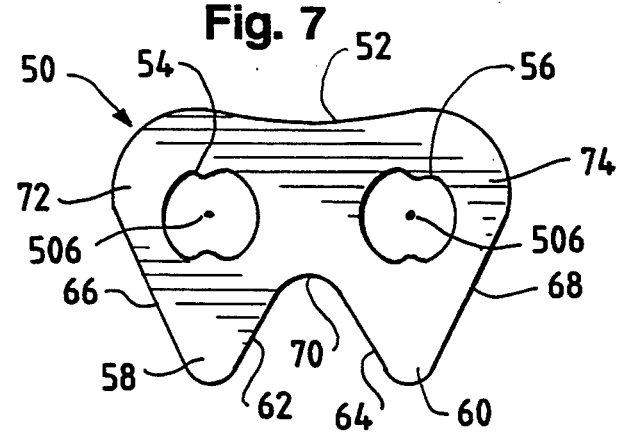
FIG. 7 is a side view of link form for an inner link of the chain of FIG. 1.
Figure 8:
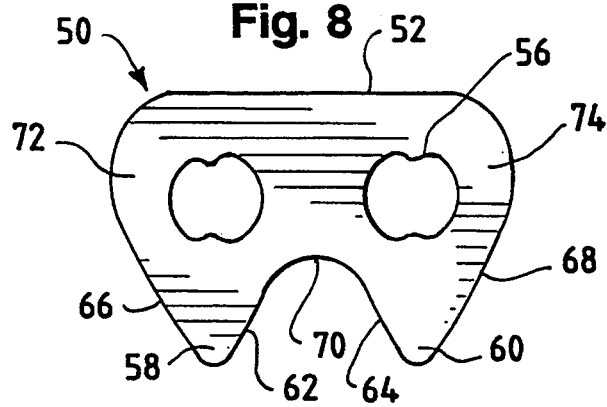
FIG. 8 is a side view of an alternate link form for an inner link of the chain of FIG. 1.

Inner links 50 are more particularly illustrated in FIGS. 7 and 8 wherein like numbers refer to like parts. The inner links 50 include a top portion 52 and a pair of apertures 54 and 56 surrounded by a pair of depending spaced toes 58 and 60, respectively. The toes are defined by inside flanks 62, 64 and outside flanks 66, 68 with the inside flanks joined by a crotch 70. End portions 72, 74 are defined by the area between the apertures and the outside flanks. FIGS. 7 and 8 illustrate inner links 50 that may be used in a chain where a rocker joint having a pin and a rocker is used. It will be appreciated by those skilled in the art that the inner links in FIGS. 7 and 8 can be mixed in a chain or that a single inner link form, such as shown in FIG. 7 can be used.

The inner links can also be modified as taught in U.S. patent application Ser. No. 07/885,194 referred to above and incorporated herein by reference. In that application, the inner links are modified to randomize the configuration of the chain strand by the use of single me and two toed links in the same or dual chain assemblies as well as the use of link sets of two different configurations, i.e., links of a first set being different from links of a second set. The links of the two link sets may differ in contour, flank configuration, leading inside flank configuration, outside flank configuration, pitch, orientation (as with asymmetrical links, types of driving contact with the sprocket teeth or other types of randomization.

Figure 6:
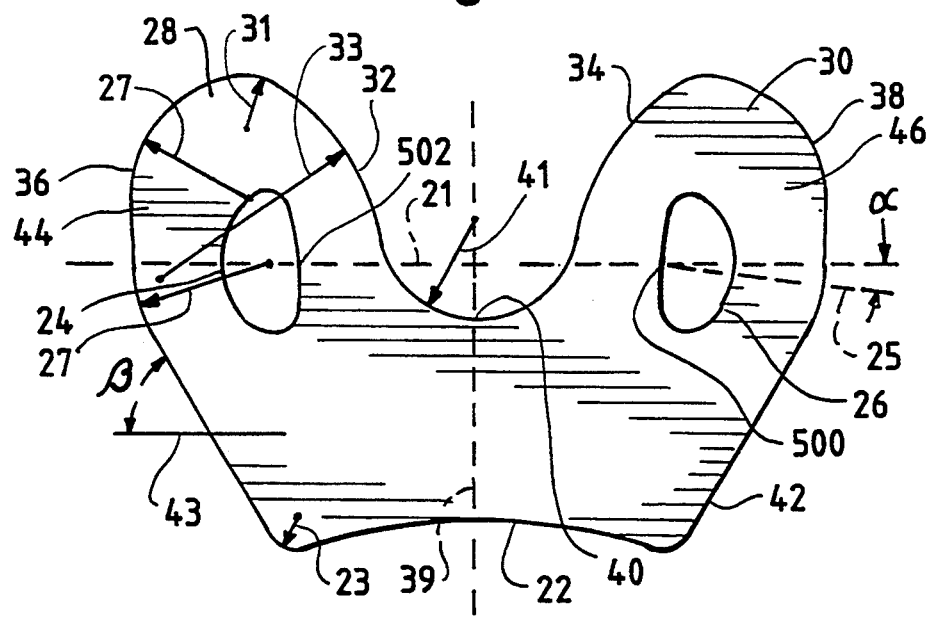
FIG. 6 is an enlarged view of the link of FIG. 4.

One embodiment of the guide link 20 of the present invention is shown more particularly in FIGS. 4 through 6 and is particularly useful with the inner links illustrated in FIGS. 7 and 8. The guide link 20 includes a rounded bottom 22 preferably concave, and a pair of spaced apertures 24 and 26 surrounded by a pair of upward extending symmetrically spaced toes 28 and 30. The toes are preferably rounded and are formed from a plurality of arcs. The apertures are provided on a horizontal centerline 21 and are symmetrical about a symmetrical centerline 25 that is rotated an amount α, preferably about 4 degrees to form a tilt angle. The toes are defined by inside flanks 32, 34 and outside flanks 36, 38, respectively. The toes are joined at the inside flanks 32, 34 by a crotch 40. The crotch 40 is preferably rounded and formed by an arc struck from the radius 41 having its center point located on the vertical center line 39 of the link. By providing a rounded crotch the formation of fatigue cracks resulting from stress risers in minimized. The root of the crotch extends below the horizontal centerline 21 of the apertures. Preferably, the root of the crotch extends more than one-half the distance from the horizontal centerline 21 to the lowermost portion of the aperture. More preferably, the root extends about 85 percent of the distance from the horizontal centerline to the lowermost portion of the aperture. End portions 44, 46 are defined by the area between the apertures and the outside flanks. Advantageously, the yield load of the guide link 20 is less than the yield load of the inner links 50, as will be more fully described below.

More particularly, as best seen in FIG. 6, the bottom 22 of the guide link 20 is joined to outwardly angled sides 42 through rounded corners formed by radius 23 which is shown for only one corner. The sides 42 are angled outward from the horizontal line 43 an amount/ at least about 45 degrees, preferably about 60 degrees. The sides are joined with the outside flanks 36, 38 at the end portions 44, 46 through an arc formed by radius 27 that has a center point on the aperture horizontal center line 21. The rounded toes 28, 30 are formed by connecting arcs having radii 29, 31, and 33 which are only shown for toe 28. The center point for the arc 29 is located on the edge of the aperture with the center point for the radius 31 directly above and located in the same vertical plane as the center point for the radius 29. The center point for the radius 33 is on the symmetrical centerline 25 outside of the aperture.

In one embodiment, the guide link 20 has a thickness A, best seen in FIG. 5, less than the thickness of the inner links 50, best seen in FIG. 7A. Preferably, the guide links have a thickness that is, at a minimum, about 75 percent, more preferably about 80 percent, of the thickness of the inner links. In another embodiment, the guide links 20 also have a hardness less than the hardness of the inner links. Preferably, the guide links have a hardness of at least about five hardness units less than the hardness of the inner links. Most preferably, the guide links have a thickness and a hardness less than the thickness and hardness of the inner links.

Figure 9:
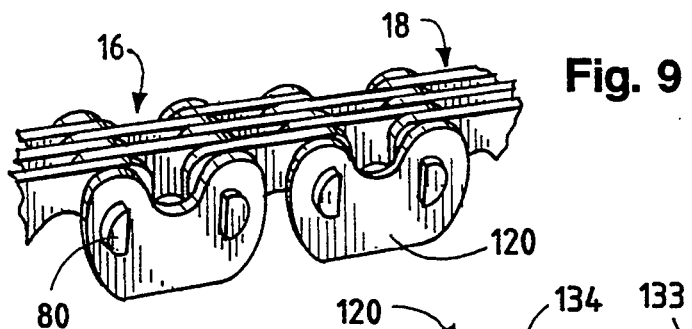
FIG. 9 is a perspective view of a segment of a chain having interlaced inner links and including the guide links of the present invention.
Figure 10:
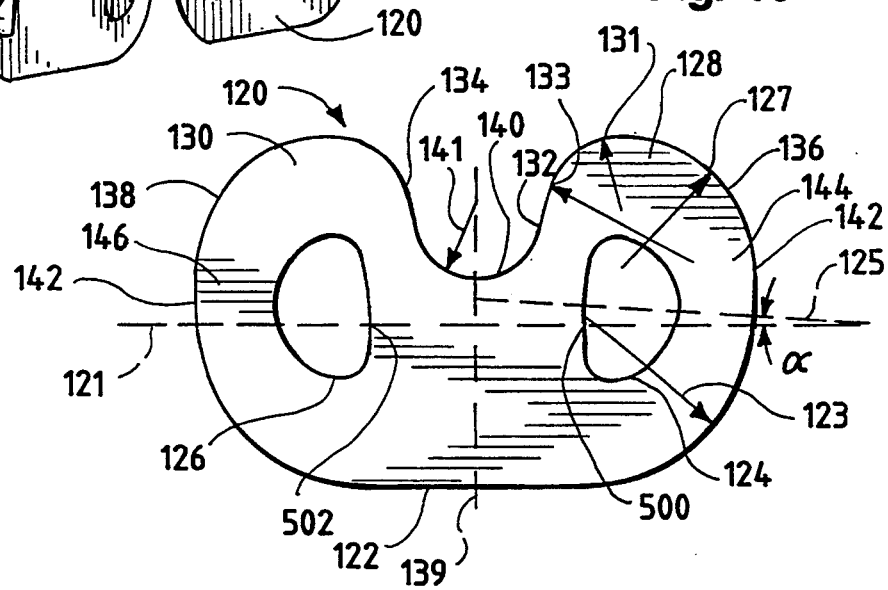
FIG. 10 is a side view of another embodiment of a link form for a guide link of the present invention, particularly for use with the chain illustrated in FIG. 9.

The guide link 20 of the present invention is useful in a silent chain embodiment where the chain links are interlaced as shown in FIGS. 2 and 3. It will be appreciated by one skilled in the art that the chain illustrated in FIGS. 2 and 3 uses a pin and rocker joint pivot member. The guide link of the present invention may also be used in a silent chain having interlaced inner links and a single pin rocker joint construction as illustrated in FIGS. 9 and 10 and which is more fully described in U.S. Ser. No. 196,598 (Attorney Docket No. 92051) titled Interlaced Single Pin Rocker Joint Chain which is incorporated herein by reference. In the chain illustrated in FIG. 9, the inner links have the same flank configuration.

Referring more particularly to FIG. 10, the guide link 120 of the present invention includes a bottom 122 and a pair of spaced apertures 124 and 126 surrounded by a pair of upward extending symmetrically spaced toes 128 and 130. The toes are preferably rounded and are formed from a plurality of arcs. The apertures are provided on a horizontal centerline 121 and are symmetrical about a symmetrical centerline 125 that is rotated an amount, preferably about 3 degrees, to form a tilt angle. The toes are defined by inside flanks 132, 134 and outside flanks 136, 138, respectively. The toes are joined at the inside flanks 132, 134 by a crotch 140. The crotch 140 is preferably rounded and is formed by an are struck from the radius 141 having its center point located on the vertical center line 139 of the link. By providing a rounded crotch, the formation of fatigue cracks resulting from stress risers is minimized. The root of the crotch extends below the top of the apertures. End portions 144, 146 are defined by the area between the apertures and the outside flanks. Advantageously, the yield load of the guide link 120 is less than the yield load of the inner links, as will be more fully described below.

The bottom 122 has a substantially flat portion that is joined to the sides 142 through rounded corners formed by a radius 123, which is shown for only one corner. The sides are joined with the outside flanks 136, 138 at the end portions 144, 146 through an arc formed by radius 127 that has a center point within the aperture.

The rounded toes 128, 130 are formed by connecting arcs having radii 131 and 133 which are only shown for toe 128.

The guide link 120 preferably has a thickness less than the thickness of the inner links. Preferably, the guide links have a thickness that is, at a minimum, about 75 percent, more preferably about 80 percent, of the thickness of the inner links. The guide links 120 preferably have a hardness less than the hardness of the inner links. More preferably, the guide links have a hardness of at least about five hardness units less than the hardness of the inner links. Most preferably, the guide links have both a thickness and a hardness less than the thickness and hardness of the .inner links.

Figure 11:
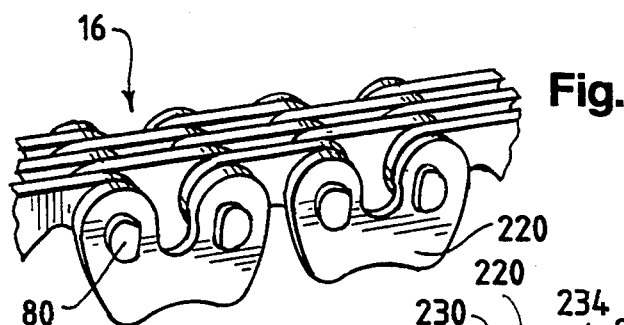
FIG. 11 is a perspective view of a segment of a chain having interlaced inner links with inner links having more than one configuration and including the guide link of the present invention.
Figure 12:
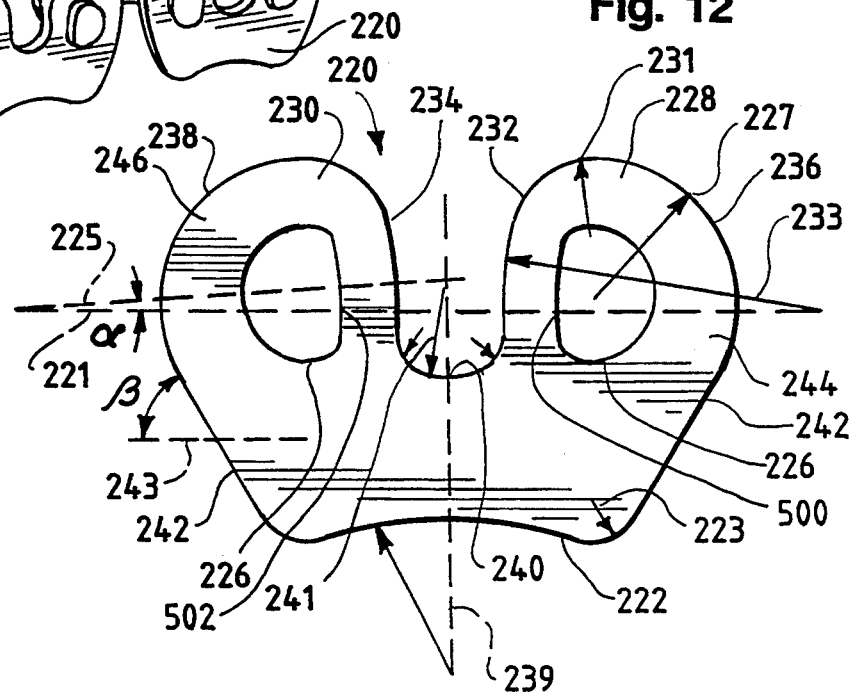
FIG. 12 is a side view of another embodiment of a link form for a guide link of the present invention, particularly for use with the chain illustrated in FIG. 11.

The guide link of the present invention can also be used in a chain having interlaced inner links and a single pin rocker joint construction and in which at least some of the inner links have a different configuration than other inner links as illustrated in FIGS. 11 and 12 and which is more fully described in U.S. Ser. No. 196,598 (Attorney Docket No. 92051) titled Interlaced Single Pin Rocker Joint Chain, which is incorporated herein by reference.

Referring more particularly to FIG. 12, the guide link 220 of the present invention includes a bottom 222 and a pair of spaced apertures 224 and 226 surrounded by a pair of upward extending symmetrically spaced toes 228 and 230. The toes are preferably rounded and are formed from a plurality of arcs. The apertures are provided on a horizontal centerline 221 and are symmetrical about a symmetrical centerline 225 that is rotated an amount or, preferably about 3 degrees to form a tilt angle. The toes are defined by inside flanks 232, 234 and outside flanks 236, 238, respectively. The toes are joined at the inside flanks 232, 234 by a crotch 240. The crotch 240 is preferably rounded and is formed by a plurality of arcs having associated radii. One arc is struck from the radius 241 having its center point located on the vertical center line 239 of the link above the horizontal pitch line but below the symmetrical center line. The other arcs are struck from radii having their center points below the horizontal pitch line. By providing a rounded crotch, the formation of fatigue cracks resulting from stress risers is minimized. The root of the crotch extends below the horizontal centerline 221 of the apertures. Preferably, the root of the crotch extends to the lowermost portion of the aperture. More preferably, the root extends below the lowermost portion of the aperture. End portions 244, 246 are defined by the area between the apertures and the outside flanks. Advantageously, the yield load of the guide link 220 is less than the yield load of the inner links, as will be more fully described below.

The bottom 222 is concave and is formed by an arc having a radius with its center point located below the link and on the vertical link center line 239. The bottom is joined to sides 242 through rounded corners formed by radius 223 which is shown for only one corner. The sides 242 are angled outward from the horizontal line 243 an amount $\beta$ at least about 45 degrees, preferably about 60 degrees. The sides are joined with the outside flanks 236, 238 at the end portions 244, 246 through an arc formed by radius 227 that has a center point within the aperture. The rounded toes 228, 230 are formed by connecting arcs having radii 231 and 233 which are only shown for toe 228. The center point for the radius 231 is located within the aperture with the center point for the radius 233 located on the horizontal pitch line away from the end portions.

The guide link 220 preferably has a thickness less than the thickness of the inner links. Preferably, the guide links have a thickness that is, at a minimum, about 75 percent, more preferably about 80 percent, of the thickness of the inner links. The guide links 220 preferably also have a hardness less than the hardness of the inner links. More preferably, the guide links have a hardness of at least about five hardness units less than the hardness of the inner links. Most preferably, the guide links have both a thickness and a hardness less than the thickness and hardness of the inner links.

The guide link of the present invention can also be used in those silent chain drive embodiments where the chain links and associated sprockets have been phased or randomized. For example, U.S. patent application Ser. No. 07/885,194 referred to above and incorporated herein by reference discloses providing a phased relationship between a pair of random or hybrid chain assemblies and a pair of sprockets. The phasing involves modifications to the chain construction, the sprocket construction, and the relationship between the positioning of the chain assemblies and sprockets. The modifications to the sprockets include the use of split sprockets that are phased by one-haft tooth, or one-haft pitch as well as various other amounts of pitch. The randomization of the sprocket teeth may be in any manner, such as variable spacing, relieved teeth, or tooth elimination. The modifications to the chain construction include the randomization of the configuration of the chain strand by the use of single toe and two toed links in the same or dual chain assemblies as well as the use of link sets of two different configurations, i.e., links of a first set being different from links of a second set. The links of the two link sets may differ in contour, flank configuration, leading inside flank configuration, outside flank configuration, pitch, orientation (as with asymmetrical links, types of driving contact with the sprocket teeth or other types of randomization.

In addition, the guide link of the present invention may be used where the chain links are block laced, as best seen in FIGS. 13 and 14. In this case, the guide link row 16 contains guide links 320 having any of the configurations illustrated in FIGS. 4, 10, or 12 or according to the principles of the present invention and is characterized by the lack of inner links. The guide link of the present invention can also be used as inner link where the driving links flank the inner link, as shown in U.S. Pat. No. 2,602,344 referred to above and incorporated herein by reference.

Figure 15:
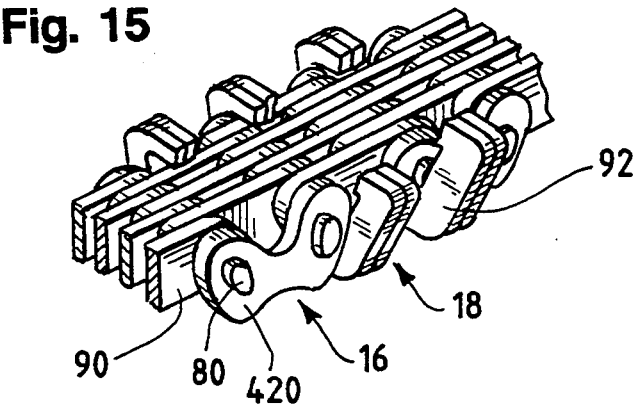
FIG. 15 is a perspective view of a segment of a chain for use in a variable pulley transmission, including load block members and guide links of the present invention.

The guide link may also be used with a chain used for a variable pulley transmission. An example of a portion of such a chain that uses a single pin rocker joint is shown in FIG. 15 and is more fully described in U.S. Ser. No. 07/961,077 filed Oct. 14, 1992 now U.S. Pat. No. 5,334,111 issued Aug. 2, 1994, which is incorporated herein by reference. Referring more particularly to FIG. 15, the chain includes a guide link row 16 having guide links 420 and inner links 90 interlaced with inner links in the non-guide link row 18. In such a chain, the inner links 90 may not have depending toes. The inner finks 90 are preferably not block laced in order to provide support for the load block 92. The inner links 90, however, may be block laced.

As noted above, the yield load of the guide links is less than the yield load of the inner links. Preferably, the yield load of the guide links is about one-half the yield load of the inner links. As a result, the guide links will plastically deform at a lower load than the inner links. The initial pitch of the guide link can then be modified to a second pitch greater than the initial pitch of the guide link and substantially the same as the pitch of the inner links.

Figure 16:
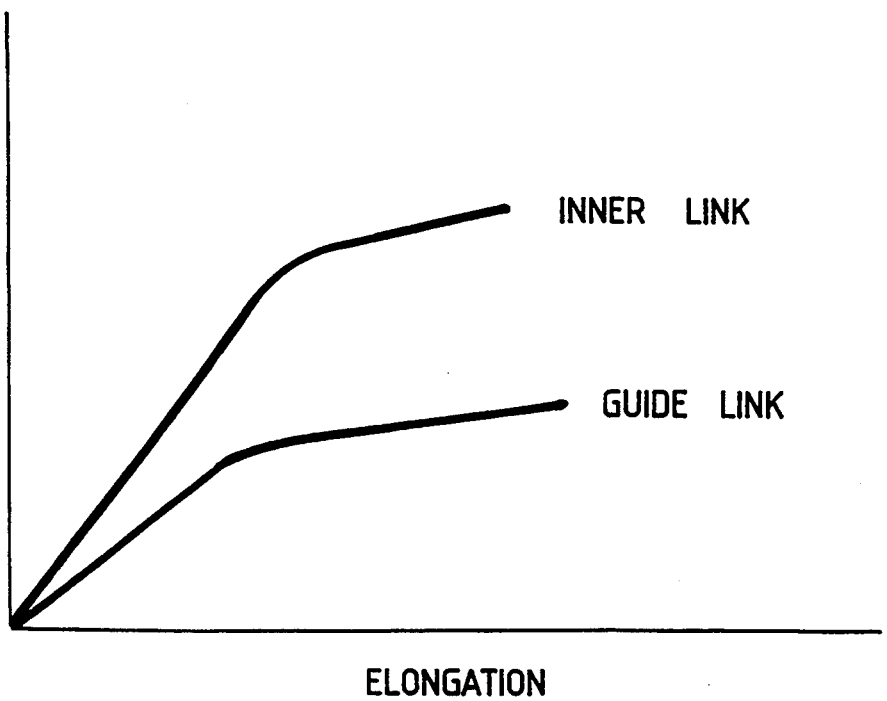
FIG. 16 is a graphical depiction of load versus elongation curves for an inner link used in the chains of FIGS. 1, 9, 11, and 13 and the guide link of the present invention.

FIG. 16 graphically depicts a stress-strain diagram for inner links and the guide link of the present invention. This depiction is intended to illustrate one example of the present invention and is not intended to illustrate all embodiments of the present invention. It will be understood from FIG. 16, that the guide links will plastically deform at a load less than the load at which the inner links will plastically deform, In this way, when the inner links plastically deform, the guide links will also plastically deform. As a result, a power transmission chain having a plurality of chain links can be made and can comprise a plurality of chain links with each chain link comprising a plurality of guide links with the guide links having a pair of spaced apertures to define a guide link pitch length; a plurality of inner links with at least a portion of the inner links disposed between the guide links, and each of the inner links having a pair of spaced apertures to define a inner link pitch length; and, pivot members connecting the guide links, with a pivot member received in opposing apertures of each of the guide links and passing through at least one aperture of each of the inner links, wherein each guide link has a yield load less than the yield load of the inner links and the guide link pitch length is substantially the same as the inner link pitch length after a pre-stressing operation.

To provide a guide link having a yield load less than the yield load of the inner links, the guide link can be configured as described above. In this way, when the guide link experiences a load, substantially all of the deformation of the guide link will occur in the area adjacent the crotch with only a minimal amount of deformation occurring in the end portions of the guide link. Alternatively, or preferably in conjunction with the configuration of the guide link, the guide link may have a thickness less than the thickness of the inner links. Preferably, the thickness of the guide link is, at a minimum, about 75 percent, preferably about 80 percent, as thick as the inner links. More preferably, the guide link has the configuration as described above and a thickness less than the thickness of the inner links.

Alternatively, the guide link can be designed to have a hardness less than the hardness of the inner links so that its yield load is less than the yield load of the inner links. The guide link has a hardness of at least about five units less than the hardness of the inner links. Preferably, the guide link has a hardness of about eight units less than the hardness of the inner links. More preferably, the guide link has the configuration as described above and a hardness less than the hardness of the inner links.

In accordance with the most preferred embodiment, the guide links have the configuration as described above and a thickness and hardness less than the thickness and hardness of the .inner links. In this most preferred embodiment, the thickness is about 80 percent the thickness of the inner links and the hardness is about eight units less than the hardness of the inner links.

The present invention also contemplates a method of making a power transmission chain wherein substantially all of its links have substantially the same pitch length. The method includes connecting a plurality of chain links to form an endless chain strand and pre-stressing the chain strand. The chain links comprise a plurality of guide links, a plurality of inner links, and pivot members connecting the guide links and inner links. The guide links have a pair of spaced apertures to define a first guide link pitch length (the distance between the points of intersection of the flat surface of the aperture 500, 502 with the pitch line or horizontal centerline). At least a portion of the inner links are disposed between the guide links and have a pair of spaced apertures to define a first inner link pitch length (the distance between the points of vertical tangency of the aperture inside front surface shown as points 504 and 506 for the pin and rocker link illustrated in FIG. 7). In one embodiment, where the guide links flank the inner links, the pivot members connect the opposing guide links and pass through at least one aperture of each of the inner links. The guide links have a yield load less than the yield load of the inner links.

After the chain strand is constructed, it is pre-stressed at a load greater than the yield load of the guide link to provide a second guide link pitch length different from the first guide link pitch length and substantially the same as the pitch length of each of the inner links. Preferably, the chain strand is pre-stressed at a load greater than the yield load of the inner links so that both the inner links and the guide links will plastically deform. In this way, both the inner links and the guide links will attain a "new" or second pitch length that is substantially the same and greater than their respective original or first pitch length.

It will be understood that by providing substantially all the chain links in the chain strand with substantially the same pitch length after this pre-stressing operation, the pivot members for will be substantially parallel to each other and any residual bending stress of the pivot members will be reduced. By using the guide link of the present invention, the pivot members are maintained substantially parallel thereby minimizing the occurrence of pin breakage near the guide link. This will also result in an increase in the overall tensile strength of the chain strand. Preferably, the chain strand is pre-stressed up to about 65 percent of the ultimate tensile strength of the chain strand. By pre-stressing the chain strand, an increase in fatigue life may result.

Figure 17:
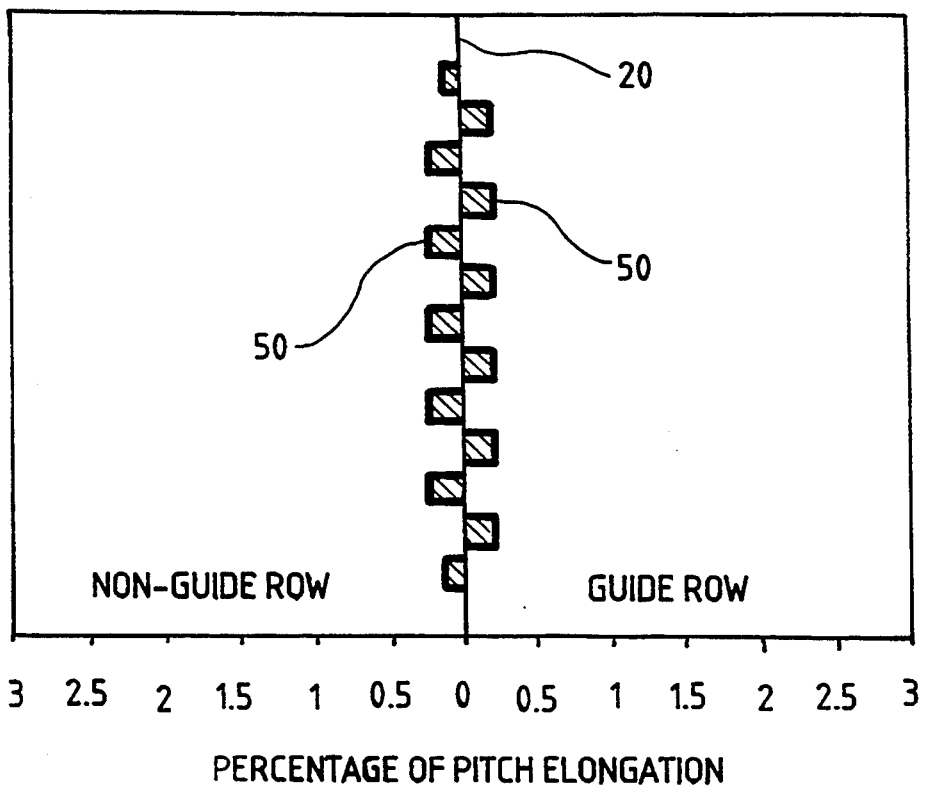
FIG. 17 is a graph depicting the percentage of pitch elongation of each of the links of a chain link in a chain according to FIG. 11 when pre-stressed to 65 percent of the tensile strength and using the guide link of the present invention that has the same hardness about five units less than the hardness of the inner links.

FIGS. 17–19 illustrate the percentage of pitch length elongation of the individual links in a chain link that has been pre-stressed. The percentage of pitch length elongation is determined from the difference between the original pitch length of the individual link and the "new" pitch length resulting from the pre-stress operation. Referring more particularly to FIG. 17, it is seen that when the guide link has a hardness approximately the same as a conventional guide link (i.e., about five units less than the inner links) it did not elongate at a load of 65% of the tensile strength. As a result, the chain strand will include chain links having pivot members subject to residual bending forces near the guide links. When, however, the hardness of the guide link is about eight units less than the hardness of the inner links, the percentage of pitch length elongation of the individual links in the chain link is more nearly uniform, as best seen in FIG. 18. As a result, the residual bending forces on the pivot member are decreased.

FIG. 19 illustrates the percentage of pitch length elongation of the individual links in the chain link when the hardness of the guide link is about eleven units less than the hardness of the inner links. Like the chain link of FIG. 18, the percentage of pitch length elongation is more nearly uniform, especially as compared to the chain link of FIG. 17.

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A power transmission chain having a plurality of chain links with each chain link comprising:
   a. two guide links, each having a thickness and a hardness, a pair of spaced apertures, and a pair of spaced toes surrounding the apertures and having an outside flank and an inside flank with the inside flank joined by a rounded crotch with the root of the crotch depending below the uppermost portion of the apertures;
   b. a plurality of inner links with at least a portion of the inner links disposed between the guide links, each of the inner links having a pair of spaced apertures and a thickness and hardness; and,
   c. pivot members connecting the guide links, with a pivot member received in opposing apertures of each of the guide links and passing through at least one aperture of each of the inner links, wherein each guide link has both a thickness and a hardness less than the thickness and hardness of the inner links so that the guide links have a yield load less than the yield load of the inner links.

2. The chain of claim 1 wherein the root of the crotch extends below the horizontal centerline of the apertures.

3. The chain of claim 1 wherein the root of the crotch extends below the apertures.

4. The chain of claim 1 wherein each guide link has a yield load that is about one-half the yield load of the inner links.

5. The chain of claim 1 wherein the toes of the guide links extend upward.

6. The chain of claim 5 wherein the toes of each guide link are symmetrically spaced.

7. The chain of claim 1 wherein the inner links comprise rows of tooth links adjacent to each other forming blocks alternating with and separated by pairs of directly adjacent flanking guide links.

8. The chain of claim 1 wherein the inner links are interleaved to form a guide row of inner links and a non-guide row of inner links with the apertures of the guide row inner links being aligned with the apertures of the guide links.

9. The chain of claim 8 wherein the inner links each have a pair of toes separated by a crotch with each toe being defined by an outside flank and an inside flank, the inside flanks being joined to the crotch.

10. The chain of claim 9 wherein some of the inner links are have a first configuration and other of the inner links have a different configuration.

11. The chain of claim 9 wherein some of the inner links are so constructed and arranged to drivingly contact the teeth of a sprocket on the outside flanks of the links only and other of the inner links are so constructed and arranged to drivingly contact the teeth of the sprocket on the inside flanks of the links.

12. The chain of claim 8 wherein at least some of the links include a load block member oriented generally transversely to the links.

13. The chain of claim 1 wherein the thickness of the guide links is about 80 percent of the thickness of the inner links.

14. The chain of claim 1 wherein the hardness of the guide links is at least about eight units less than the hardness of the inner links.

15. The chain of claim 1 wherein the thickness of the guide links is about 80 percent of the thickness of the inner links and the hardness of the guide links is at least about eight units less than the hardness of the inner links.

16. The chain of claim 15 wherein when the guide link deforms, substantially all of the deformation of the guide link occurs in the area adjacent the crotch with only a minimal amount of deformation occurring in the end portions of the guide link.

17. A flanking guide link for use with a chain constructed of an assembly of links and pivot members, with the chain having a plurality of sets of flanking guide links interleaved with sets of inner links with adjacent sets being interlaced, each link having a pair of spaced apertures with one set of apertures of one link set being transversely aligned with one set of apertures of the next adjacent link set, each guide link comprising:
   a. a bottom; and
   b. a pair of upward extending spaced toes surrounding the apertures and having an outside flank and an inside flank joined by a rounded crotch with the root of the crotch depending below the uppermost portion of the apertures wherein the inner links have a thickness and a hardness and the guide links have a thickness and a hardness less than the thickness and the hardness of the inner links so that the guide links have a yield load less than the yield load of the inner links.

18. A flanking guide link for use with a chain constructed of an assembly of links and pivot members, with the chain having a plurality of sets of flanking guide links interleaved with sets of inner links with adjacent sets being interlaced, each link having a pair of spaced apertures with one set of apertures of one link set being transversely aligned with one set of apertures of the next adjacent link set, each guide link comprising:
   a. a concave bottom; and
   b. a pair of spaced toes surrounding the apertures and having an outside flank and an inside flank joined by a rounded crotch with the root of the crotch depending below the horizontal centerline of the apertures wherein the guide link has a yield load less than the yield load of the inner links.

19. The guide link of claim 18 further having a yield load of about one-half the yield load of the inner links.

20. The guide link of claim 19 wherein the guide links have a hardness and a thickness and the inner links have a hardness and a thickness with both the thickness and hardness of the guide links being less than the thickness and hardness of the inner links.

21. A guide link for use with a chain having rows of identical inverted inner links stacked adjacent to each other to form blocks alternating with and separated by pairs of flanking guide links, the body of the guide link comprising:
  a. a bottom;
  b. a pair of spaced apertures; and,
  c. a pair of spaced toes surrounding the apertures and having an outside flank and an inside flank joined by a rounded crotch, the root of the crotch depending below the uppermost portion of the apertures wherein the inner links have a thickness and a hardness and the guide links have a thickness and a hardness less than the thickness and the hardness of the inner links such that the guide link has an yield load about one-half the yield load of the inner links.

22. The guide link of claim 21 wherein the bottom is concave and the root of the crotch depends below the horizontal centerline of the apertures.

23. A guide link for use with a chain having rows of identical inverted inner links stacked adjacent to each other to form blocks alternating with and separated by pairs of flanking guide links, the body of the guide link comprising:
  a. a concave bottom;
  b. a pair of spaced apertures; and,
  c. a pair of spaced toes surrounding the apertures and having an outside flank and an inside flank joined by a rounded crotch, the root of the crotch depending below the horizontal centerline of the apertures wherein the guide link has a yield load about one-half the yield load of the inner links.

24. A method of producing a power transmission chain wherein substantially all of its links have substantially the same pitch length, comprising:
  a. connecting a plurality of chain links to form an endless chain strand, the chain links including:
    i. a plurality of flanking guide links, the guide links having a pair of spaced apertures to define a first guide link pitch,
    ii. a plurality of inner links with at least a portion of the inner links disposed between the guide links, each of the inner links having a pair of spaced apertures to define a first inner link pitch and,
    iii. pivot members connecting the guide links, with a pivot member received in opposing apertures of each of the guide links and passing through at least one aperture of each of the inner links, wherein each guide link has a yield load less than the yield load of the inner links; and,
  b. pre-stressing the chain strand at a load greater than the yield load of the inner link to provide a second guide link pitch different from the first guide link pitch and a second inner link pitch different from the first inner link pitch, the second guide link pitch being substantially the same as the second inner link pitch.

25. The method of claim 24 wherein
  a. the guide links each have a thickness and a hardness and a pair of spaced toes surrounding the apertures and having an outside flank and an inside flank with the inside flank joined by a rounded crotch with the root of the crotch depending below the uppermost portion of the apertures; and,
  b. each of the inner links have a thickness and a hardness with the both the thickness and hardness of the guide links being less than the thickness and hardness of the inner links so that the guide links have a yield load less than the yield load of the inner links.

26. The method of claim 25 wherein the root of the guide link crotch depends below the horizontal centerline of the apertures.

27. The method of claim 26 wherein each guide link further has a concave bottom.

28. A power transmission chain having a plurality of chain links, with each chain link comprising:
  a. a pair of guide links, the guide links having a pair of spaced apertures to define a guide link pitch;
  b. a plurality of inner links with at least a portion of the inner links disposed between the guide links, each of the inner links having a pair of spaced apertures to define a inner link pitch; and,
  c. pivot members connecting the guide links, with a pivot member received in opposing apertures of each of the guide links and passing through at least one aperture of each of the inner links, wherein each guide link has a yield load less than the yield load of the inner links and the guide link pitch is substantially the same as the inner link pitch after a pre-stressing operation.

29. The chain of claim 28 wherein the pre-stressing load is greater than the yield load of the inner links.

* * * * *

UNITED STATES PATENT AND TRADEMARK OFFICE
CERTIFICATE OF CORRECTION

PATENT NO. : 5,445,570
DATED : August 29, 1995
INVENTOR(S) : David C. White

It is certified that error appears in the above-indentified patent and that said Letters Patent is hereby corrected as shown below:

In the Claims

Col. 15, In Claim 10, line 2, delete "are".

Col. 17, In Claim 21, line 15, delete "an" and substitute --a--.

Col. 18, In Claim 25, line 9, delete the first occurrence of "the".

In Claim 28, line 8, delete "a".

Signed and Sealed this

Twenty-fifth Day of June, 1996

Attest:

BRUCE LEHMAN

Attesting Officer    Commissioner of Patents and Trademarks